(12) United States Patent
Schreck

(10) Patent No.: US 7,303,384 B2
(45) Date of Patent: Dec. 4, 2007

(54) DEVICE FOR SPRAYING-ON OF ESPECIALLY PLASTIC MOULDINGS

(76) Inventor: Hans Schreck, Urbachstrasse 32, D-35099 Burgwald-Bottendorf (DE)

( * ) Notice: Subject to any disclaimer, the term of this patent is extended or adjusted under 35 U.S.C. 154(b) by 393 days.

(21) Appl. No.: 10/950,634

(22) Filed: Sep. 28, 2004

(65) Prior Publication Data
US 2005/0067510 A1    Mar. 31, 2005

(30) Foreign Application Priority Data
Sep. 29, 2003   (DE)   ................ 103 45 578

(51) Int. Cl.
*B29C 45/22*   (2006.01)
(52) U.S. Cl. ............... 425/192 R; 425/570; 425/572
(58) Field of Classification Search ................ 425/190, 425/567, 570, 572, 588, 192 R
See application file for complete search history.

(56) References Cited

U.S. PATENT DOCUMENTS

| 5,494,433 | A |   | 2/1996 | Gellert |         |
|-----------|---|---|--------|---------|---------|
| 5,536,165 | A | * | 7/1996 | Gellert | 425/549 |
| 5,591,465 | A | * | 1/1997 | Babin   | 425/549 |
| 5,885,628 | A |   | 3/1999 | Swenson et al. | |
| 5,952,016 | A | * | 9/1999 | Gellert | 425/190 |
| 5,980,237 | A | * | 11/1999 | Swenson et al. | 425/549 |
| 2002/0098262 | A1 | * | 7/2002 | Babin | 425/562 |
| 2005/0196486 | A1 | * | 9/2005 | Babin et al. | 425/570 |

FOREIGN PATENT DOCUMENTS

| DE | 44 00 598 A1 | 1/1994 |
| EP | 0 186 413 A2 | 12/1985 |
| EP | 0 186 413 A3 | 12/1985 |
| EP | 0 447 573 A1 | 3/1990 |

* cited by examiner

*Primary Examiner*—Yogendra N. Gupta
*Assistant Examiner*—Emmanuel S Luk
(74) *Attorney, Agent, or Firm*—Reed Smith LLP; Stanley P. Fisher, Esq.; Juan Carlos A. Marquez, Esq.

(57) ABSTRACT

The invention relates to a device for spraying-on of especially plastic mouldings, wherein at least one mould cavity to be filled, constructed in a tool is arranged laterally next to a central nozzle body, with at least one nozzle tip arranged in and/or on the nozzle body which projects outwards over the circumferential surface of the nozzle body and forms an injection channel for the mould cavity in a recess of the tool and/or the nozzle body, wherein at least one further recess is arranged in the area of the bottom of the nozzle body, wherein this recess is provided with at least one through opening which connects the recess to the circumferential surface of the nozzle body and wherein the nozzle tip can be inserted through the recess into the opening and detachably affixed there.

26 Claims, 4 Drawing Sheets

DEVICE FOR SPRAYING-ON OF ESPECIALLY PLASTIC MOULDINGS

The invention relates to a device for spraying-on of especially plastic mouldings, wherein at least one mould cavity to be filled, constructed in a tool is arranged laterally next to a central nozzle body, with at least one nozzle tip arranged in and/or on the nozzle body which projects outwards over the circumferential surface of the nozzle body and forms an injection channel for the mould cavity in a recess of the tool and/or the nozzle body, according to the preamble of claim 1.

In known devices of this type, the nozzle tips are fixed in the nozzle body before assembling the tool, generally screwed in. In order to then make it possible to assemble the tool, the tool, that is, the element in which the mould cavities to be filled are arranged, must be segmented and dismountable according to the number of nozzles and mould cavities. This requires, on the one hand, a comparatively high constructive effort and on the other hand, the assembly of the tool is complex and time-consuming and thereby incurs high costs.

Starting from this prior art, it is the object of the present invention to provide a generic device which has a simple structure and is mountable and dismountable in a simple and cheap fashion.

This object is solved by a device according to the teaching of claim 1.

Advantageous embodiments of the invention are the subject matter of the dependent claims.

The device according to the invention for spraying-on of especially plastic mouldings has, in an initially inherently known fashion, at least one mould cavity to be filled, constructed in a tool which is arranged laterally next to a central nozzle body, and at least one nozzle tip arranged in and/or on the nozzle body which projects outwards over the circumferential surface of the nozzle body and forms an injection channel for the mould cavity in a recess of the tool and/or the nozzle body.

According to the invention, there is at least one further recess arranged in the area of the bottom of the nozzle body, wherein this recess is provided with at least one through opening which connects the recess to the circumferential surface of the nozzle body and wherein the nozzle tip can be inserted through the recess into the opening and can be detachably affixed there. As a result of this structure, during assembly of the tool the nozzle body can initially be inserted into the corresponding recess of the tool in a more or less form-locking manner without especially projecting nozzle tips, after which the nozzle tips are only then mounted by engagement in the respective mould cavities or the corresponding feed channels. Thus, segmenting of the tool is no longer necessary.

In a fundamentally arbitrary manner an arrangement with only one mould cavity is feasible. Preferably however, a plurality of nozzle tips is provided and the recess is provided with a number of openings correspond to the number of nozzle tips.

The arrangement of the mould cavities in the tool and thus correspondingly the arrangement of the nozzle tips in the nozzle body is arbitrary. According to one exemplary embodiment however, the nozzle tips are arranged in the nozzle body at least in groups in a row and/or in the fashion of a triangle, square or a polygon shape. In this case, the arrangement can take place not only in a plane but also spatially offset.

According to a further exemplary embodiment, the nozzle body has at least in sections, a substantially cylindrical shape wherein the openings are arranged such that the nozzle tips project in a substantially star shape in the radial direction from the nozzle body. With such an arrangement, a simple, substantially rotationally symmetrical structure of the device is obtained.

The shape of the recess in the bottom of the nozzle body is initially fundamentally arbitrary. According to a preferred exemplary embodiment however, the recess has a substantially dish-shaped cylindrical or polygonal cross-sectional shape with a base running perpendicular to the longitudinal axis of the nozzle body and a side wall running substantially perpendicular thereto. In this case, the openings are preferably arranged substantially in the area of the side wall.

The nozzle tips can be fixed in the nozzle body in an arbitrary fashion. According to one exemplary embodiment, for this purpose the nozzle tips have a flange-, collar- or head-like shoulder on their end opposite the tip, wherein the collar surface of the head-like shoulder of the nozzle tips pointing towards the side wall of the recess is constructed as a stop face, which can be brought to rest supported on the side wall of the recess. As a result, a precisely axially specified position of the nozzle tips in the nozzle body is obtained.

The nozzle tips and the through openings are preferably provided at least in sections with substantially cylindrical fitting areas such that the nozzle tips can be inserted into the openings at least substantially free from play. As a result, a precisely radially specified position of the nozzle tips in the nozzle body is obtained. The terms "axial" and "radial" relate to the longitudinal axis of the nozzle tips.

In order to remove the nozzle tips from the nozzle body during dismantling of the tool or for repair purposes or the like, according to one exemplary embodiment the head-like shoulder has an engagement for a tool with which the nozzle tips can be pulled out of the opening. In this case, the engagement can be formed, for example, by an annular-groove-like indentation surrounding the head-like shoulder at least in sections on its radial outer surface or it can be formed by an inner thread formed in the head surface.

According to a further exemplary embodiment, in the recess between the head-like shoulders of the nozzle tips there is detachably arranged a fixing element whose outer surfaces pointing towards the head surfaces of the nozzle tips are constructed as stop faces on the head surfaces such that when the nozzle tips are mounted and the fixing element is mounted, the head surfaces of the nozzle tips come to rest supported on the stop faces. In other words, this means that this fixing element serves as protection against unintentional loosening of the nozzle tips by sliding out of the respective opening of the nozzle body into the recess.

The shape of this fixing element is fundamentally arbitrary. For example, this can be constructed as ring-shaped, star-shaped or rod-shaped. Preferably however, the fixing element is constructed as a substantially cylindrical or polygonal fixing block in cross-section, which can be detachably affixed by means of a fixing screw at the bottom of the recess.

According to a further embodiment of the fixing of the nozzle tips in the nozzle body, the nozzle tips are provided, at least in sections, with an outer thread and the through openings in the nozzle body are provided, at least in sections, with an inner thread complementary thereto so that the nozzle tips can be screwed into the openings. In this case, the head-like shoulder can be constructed in the fashion of a screw head, especially in the fashion of a hollow screw with hexagonal recess.

The recess in the nozzle body can basically remain open. However, in order to especially prevent contamination of the nozzle tips in this area, according to a further exemplary embodiment the recess can be directly or indirectly closed with a cover.

According to a preferred exemplary embodiment, the openings at their end pointing towards the outer circumferential surface of the nozzle body have an internal diameter which is larger than the external diameter of the nozzle tips in this region. As a result, between the outer wall of the nozzle tips and the inner wall of the openings there is formed a region having an annular cross-section into which the plastic material is injected. In this case, the annular region can be enclosed by a ring element which is arranged in the opening of the nozzle body. This ring element can furthermore be exchangeable.

According to an especially preferred exemplary embodiment, the ring element consists of a poorly heat-conducting material, especially of titanium. It can thereby be reliably prevented that during injection of molten plastic material, this already solidifies in the area of the nozzle tips.

The ring element can end flush with the outer circumferential surface of the nozzle body or even be set back with respect to this. Preferably however, the ring element projects at least slightly over the outer circumferential surface of the nozzle body and can be brought to rest so that it seals against the allocated surface of the tool having the mould cavity. As a result, on the one hand, undesirable leakage of the plastic material into the gap between the tool and the nozzle body can be prevented and on the other hand, the heat losses caused by heat conduction between the nozzle body and the tool can be minimised.

According to one exemplary embodiment, the plastic material can be fed to the tool or to the mould cavities via a central feed channel in the nozzle body which branches into feed pipes to the nozzle tips. In this case, the feed pipes can open directly into the annular region around the nozzle tips.

According to an alternative embodiment, the nozzle tips each have a substantially continuous recess in the longitudinal direction which extends from the head surface into the region of the tip wherein the feed pipes open into the nozzle tips in the area of the head surface so that the plastic material is injected directly into the annular region via the nozzle tips.

In this case, the fixing element can have substantially radially running channels corresponding to the number of the nozzle tips, wherein these feed channels are connected at their first end to the feed channel of the nozzle body and open into the respective nozzle tips at their second end.

Especially if molten plastics are to be processed, according to a further exemplary embodiment the nozzle body can be provided with a device for tempering, especially with a heating device.

The invention is explained subsequently with reference to drawings which show merely exemplary embodiments. In the figures.

Figure 1:
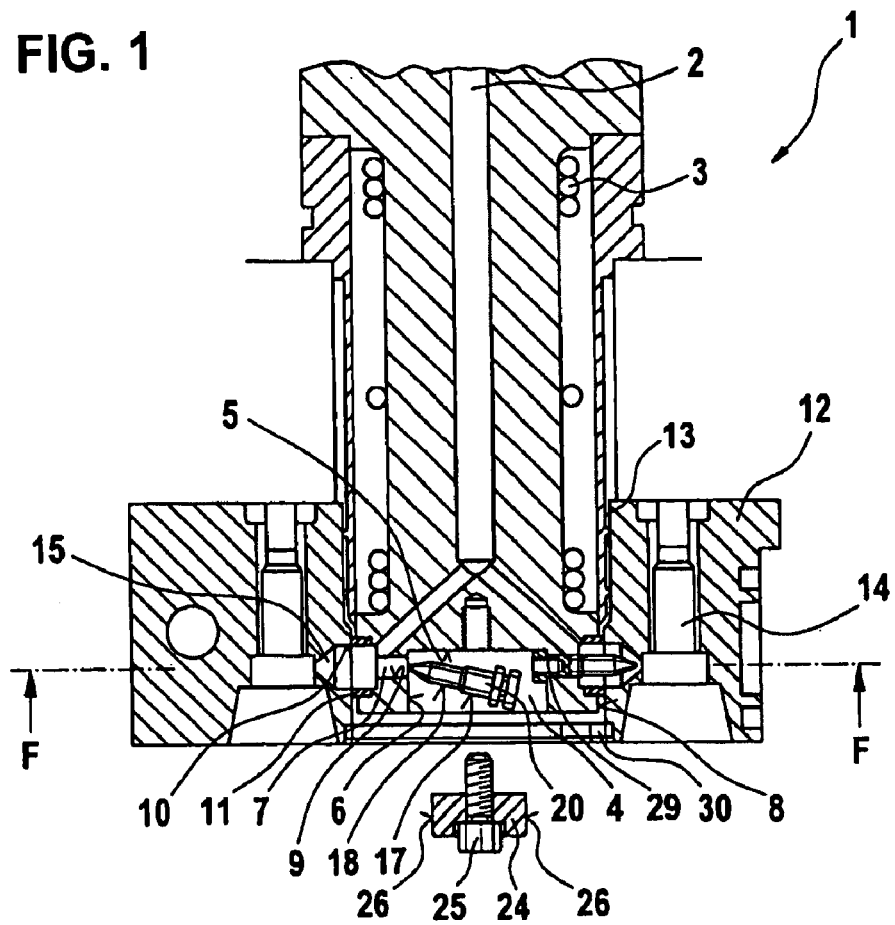
FIG. 1 shows a first exemplary embodiment of a device according to the invention in the partly mounted state in merely schematic longitudinal cross-section.
Figure 2:
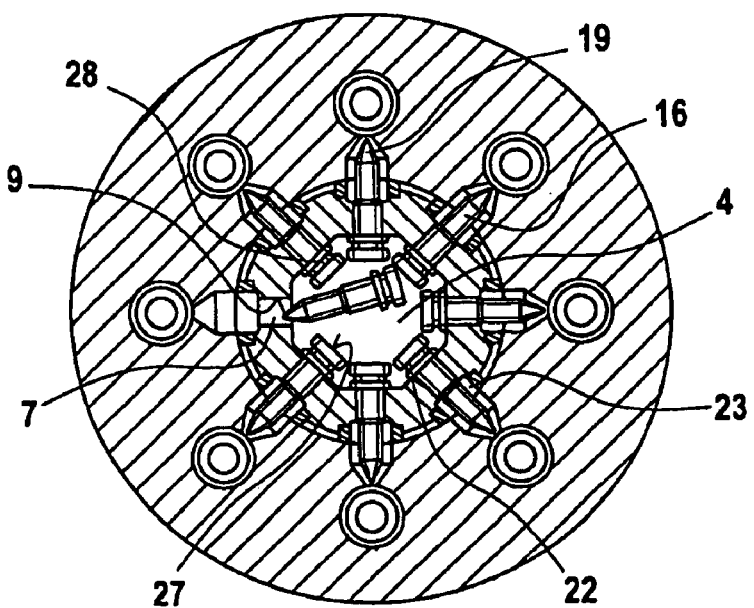
FIG. 2 shows the exemplary embodiment from FIG. 1 in highly schematic cross-section along the line of intersection F-F in FIG. 1.
Figure 3:
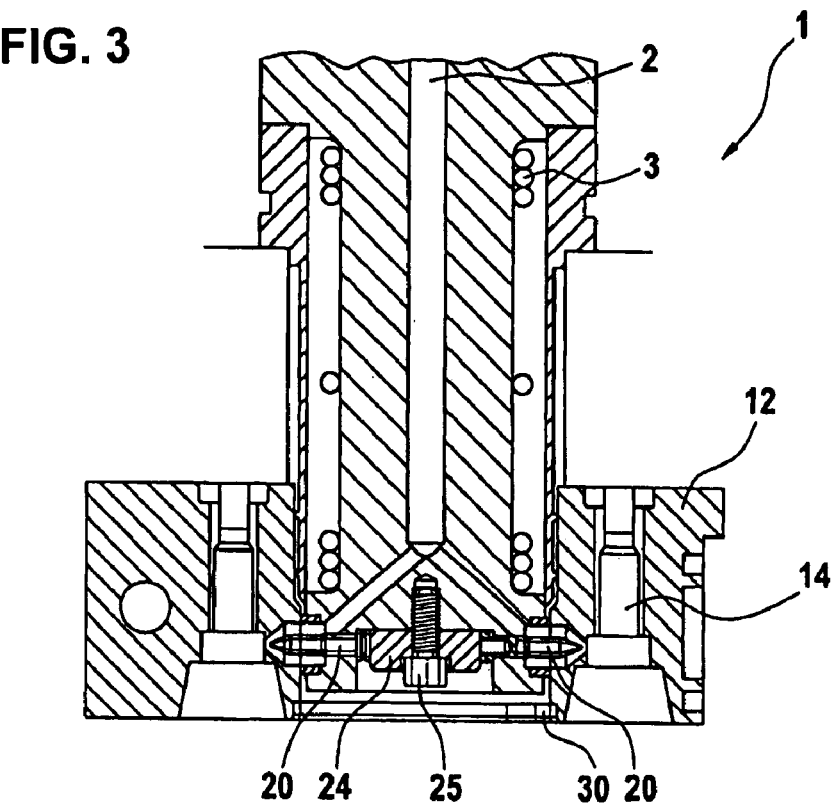
FIG. 3 shows the exemplary embodiment from FIGS. 1 to 2 in a view corresponding to FIG. 1 in the ready-mounted state of the nozzle tips.
Figure 4:
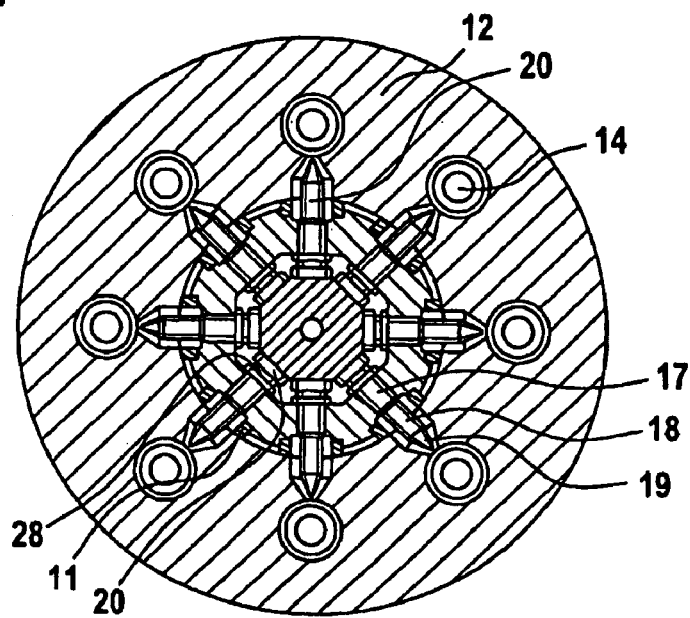
FIG. 4 shows the exemplary embodiment from FIGS. 1 to 3 in a view corresponding to FIG. 2.

The device shown in FIG. 1 initially has a nozzle body 1 which is constructed overall in sections as a substantially circular cylinder. The nozzle body 1 is provided with a central feed channel 2 via which the plastic material to be injected is conveyed to the actual nozzles. In order to ensure reliable conveyance without solidification of the liquid plastic material, the nozzle body 3 is provided with a heating device 3, merely indicated schematically, which embraces the nozzle body in sections in the fashion of a winding.

Located in the area of the bottom of the nozzle body 1 is a recess 4 in the nozzle body 1 which has a substantially dish-like shape with a flat bottom 5 and a polygonal side wall 6 running perpendicular thereto. The side wall 6 is provided with eight through openings 7 arranged in a star shape, which connect the recess 4 to the circumferential surface 8 of the nozzle body 1. The openings 7 each have the same shape with a substantially cylindrical fitting area 9 and a likewise substantially cylindrical region 10 with larger diameter.

Inserted in this region 10 of larger diameter is a ring element 11 made of titanium which projects slightly over the outer circumferential surface 8 of the nozzle body.

During assembly the nozzle body 1 is inserted in a central recess 13 of the actual tool 12, which has eight mould cavities 14 to be filled, so that the openings 7 each lie opposite an injection opening 15 of each mould cavity 14 of the tool 12, wherein each ring element 11 comes to rest against the wall of the tool 12 in a sealing fashion. After this pre-assembly, which requires no division of the tool, the nozzle tips 16 are assembled as described herein-after.

The nozzle tips 20 have a cylindrical shape, at least in sections, with two cylindrical sections 17 and 18 as well as a tip 19. At their end lying opposite to the tip 19, the nozzle tip 20 is provided with a head-like shoulder 21.

After the pre-assembly of the nozzle body has been carried out as described previously, the nozzle tips 20 are inserted through the openings 7 into the nozzle body 1 such that the section 17 constructed as a fitting area comes to rest against the cylindrical fitting area 9 of the opening 7. At the same time, the collar surface 22 of the head-like shoulder 21 comes to rest supported against the side wall 6 of the recess 4. The smaller-diameter section 18 of the nozzle tip 20 projects through the larger-diameter section of the opening 7 formed by the ring element 11 and there forms an annular region 23. The tip 19 of the nozzle tip 1 projects radially outwards over the nozzle body 1 and engages into the conical injection opening 15 of the tool 12. The annular space formed between the ring element 11 and the inner wall of the injection opening 15 on the one hand and the outer surface of the nozzle tip 20 on the other hand is used to inject the plastic material into the respective mould cavity.

When all the nozzle tips 20 are inserted in their respective openings 7, a block-like fixing element 24 is inserted from below into the recess 4 and is screwed in there by means of a fixing screw 25 at the bottom 5 of the recess 4. Like the recess 4, the fixing element also has a polygonal, if necessary however, also a cylindrical shape with stop faces 26. When the fixing element 24 is screwed in, the stop faces 26 comes to rest on the head surfaces 27 of the nozzle tips 1 and thus hold these reliably in their assembly position.

For dismantling or to change the nozzle tips 20, the fixing element 24 is first removed from the recess 24 by loosening the fixing screw 25. The nozzle tips 1 are then pulled out of the openings 7, if necessary with the aid of a tool not shown. For this purpose, the nozzle tips 20 either have an annular-groove-like indentation 28 or an inner thread 29 in the head-like shoulder 21 on which the tool can be brought to rest or to engagement.

In order to protect the recess against the penetration of dirt or the like, the recess 4 is to be closed with a cover 30.

The central feed channel 2 in the nozzle body I branches in a star shape into feed pipes 31 to the individual nozzle tips 1 which each open directly into the annular space between the nozzle tip 20 and the opposite wall regions of the nozzle body 1 or ring element 11 and the injection opening 15.

Figure 5:
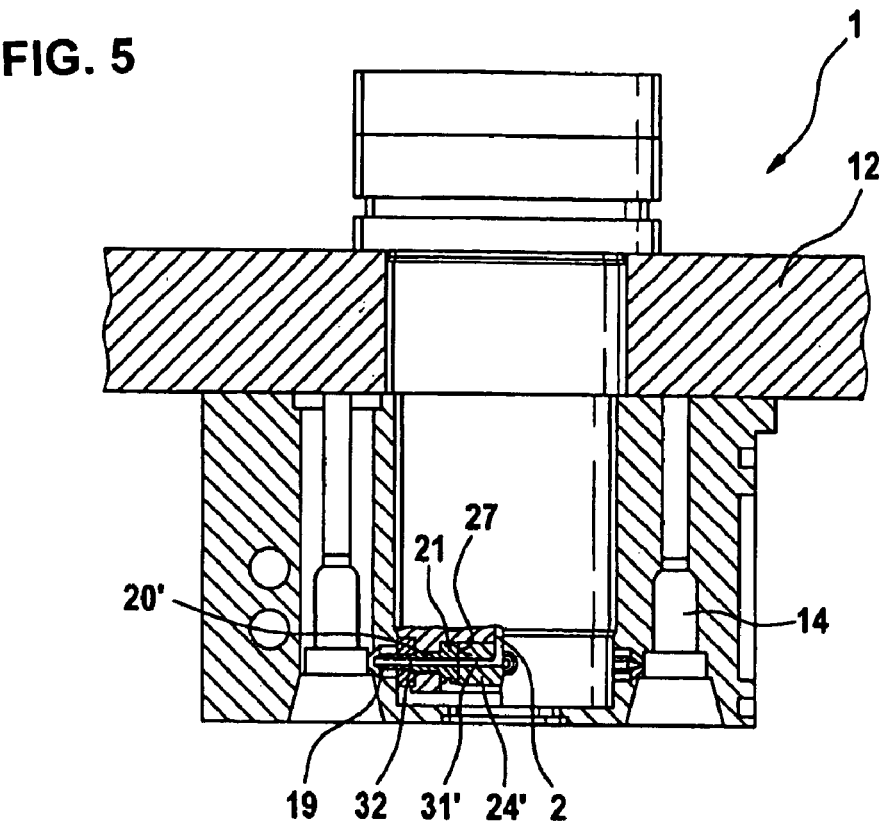
FIG. 5 shows a second exemplary embodiment of a device according to the invention in a lateral, partly cutaway, schematic view, wherein the plastic material to be injected is supplied through the nozzle tips.
Figure 6:
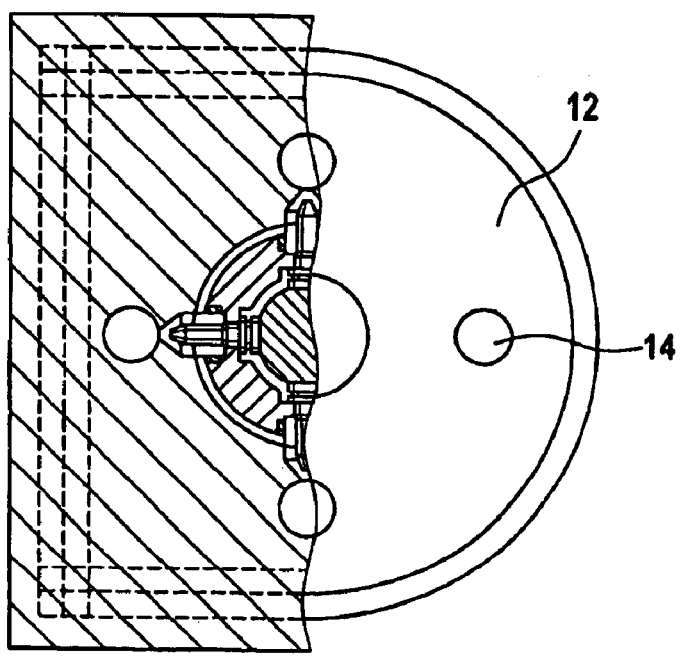
FIG. 6 shows the exemplary embodiment from FIG. 5 in a partly cutaway view from below.

The exemplary embodiment from FIGS. 5 and 6 has fundamentally the same structure. In contrast to the exemplary embodiment described previously however, the central feed channel 2 opens into the fixing element 24' and is there guided in a star shape via feed pipes 31' to the nozzle tips 20'. The nozzle tips 20' each have a continuous recess 32 in the longitudinal direction which extends from the head surface 27 of the head-like shoulder 21 into the area of the tip 19 and there opens into the annular space.

Figure 7:
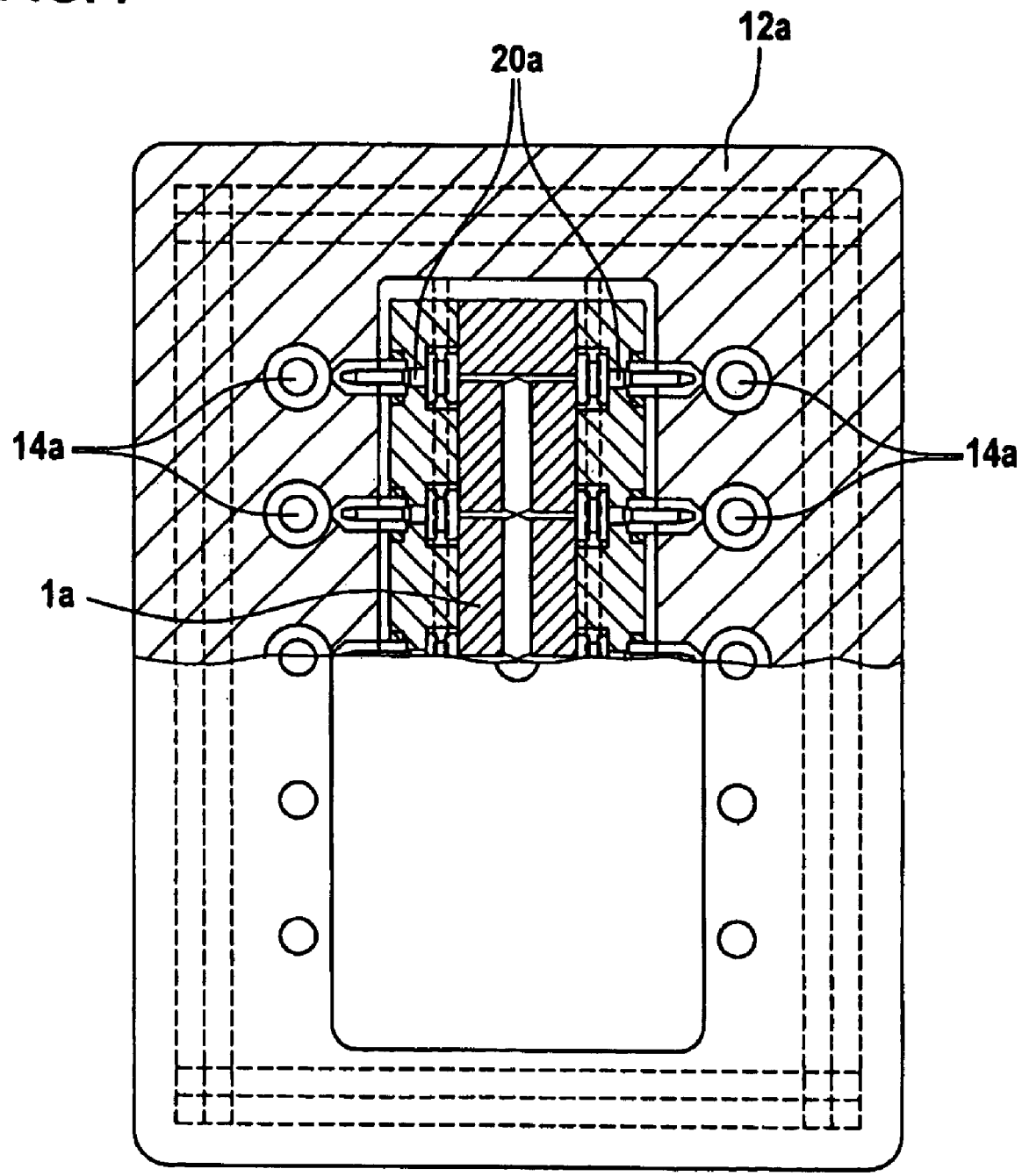
FIG. 7 shows a further exemplary embodiment of a device according to the invention in a partly cutaway view from below, wherein the nozzles are arranged in two rows.

In contrast to the exemplary embodiments from FIGS. 1 to 5 in which the mould cavities are arranged in a circle and the nozzle tips are arranged in a corresponding star shape, the exemplary embodiment shown schematically in FIG. 7 has a tool 12*a* in which the mould cavities 14*a* to be filled are arranged in two parallel rows. In a corresponding arrangement the nozzle tips 20*a* are also provided in two parallel rows in a substantially rectangular nozzle body 1*a* having an oblong cross-section. The fixing of the nozzle tips in the nozzle body corresponds to the fixing described previously.

The invention claimed is:

1. A device for spraying-on of especially plastic mouldings, comprising a central nozzle body and at least one nozzle tip,
    wherein at least one mould cavity to be filled, constructed in a tool is arranged laterally next to the central nozzle body
        at least one nozzle tip is arranged in or on the nozzle body, projects outwards over the circumferential surface of the nozzle body and forms an injection channel for the mould cavity in a recess of the tool,
    wherein at least one recess is arranged in the area of the bottom of the nozzle body,
    wherein the recess arranged in the area of the bottom of the nozzle body is provided with at least one through opening which connects the recess arranged in the area of the bottom of the nozzle body to the circumferential surface of the nozzle body, and
    wherein the nozzle tip is adapted for being inserted through the recess into the opening and detachably affixed there.

2. The device according to claim 1,
    wherein a plurality of nozzle tips is provided and at least one recess arranged in the area of the bottom of the nozzle body is provided with a number of through openings corresponding to the number of nozzle tips.

3. The device according to claim 2,
    wherein the nozzle tips are arranged in the nozzle body at least in groups in rows and/or in the fashion of a triangle, square or in a polygon shape.

4. The device according to claim 2,
    wherein the nozzle body has a substantially cylindrical shape, at least in sections, wherein the openings arc arranged such that the nozzle tips project substantially in a star shape in the radial direction from the nozzle body.

5. The device according to claim 4,
    wherein the at least one recess arranged in the area of the bottom of the nozzle body has a substantially dish-shaped cylindrical or polygonal cross-sectional shape with a base running perpendicular to the longitudinal axis of the nozzle body and a side wall running substantially perpendicular thereto.

6. The device according to claim 5,
    wherein the openings are arranged substantially in the area of the side wall.

7. The device according to claim 2,
    wherein the nozzle tips have a flange-, collar- or head-like shoulder at their end opposite the tip.

8. The device according to claim 7,
    wherein the collar surface of the head-like shoulder of the nozzle tips pointing towards the side wall of the at least one recess arranged in the area of the bottom of the nozzle body is constructed as a stop face which can be brought to rest supported on the side wall of the recess.

9. The device according to claim 2,
    wherein the nozzle tips and the through openings are provided, at least in sections, with substantially cylindrical fitting areas such that the nozzle tips can be inserted into the openings at least substantially free from play.

10. The device according to claim 7,
    wherein the head-like shoulder has an engagement for a tool with which the nozzle tips can be pulled from the opening.

11. The device according to claim 10,
    wherein the engagement is formed by an annular-groove-like indentation encircling the head-like shoulder on its radial outer surface, at least in sections.

12. The device according to claim 10,
    wherein the engagement is formed by an inner thread constructed in the head surface.

13. The device according to claim 2,
    wherein by a fixing element which can be arranged in the at least one recess arranged in the area of the bottom of the nozzle body between the head-like shoulders of the nozzle tips, whose outer surfaces pointing towards the head surfaces of the nozzle tips are constructed as stop faces on the head surfaces such that when the nozzle tips are mounted and the fixing element is mounted, the head surfaces of the nozzle tips come to rest supported on the stop faces.

14. The device according to claim 13,
    wherein the fixing element is constructed as a fixing block having a substantially cylindrical or polygonal cross-section which can be detachably affixed at the bottom of the recess by means of a fixing screw.

15. The device according to claim 2,
    wherein the nozzle tips are provided, at least in sections, with an outer thread and the through openings are provided, at least in sections, with an inner thread complementary thereto so that the nozzle tips can be screwed into the openings.

16. The device according to claim 15, wherein the head-like shoulder is constructed in the fashion of a screw head, especially in the fashion of a hollow screw with a hexagonal recess.

17. The device according to claim 1, wherein the at least one recess arranged in the area of the bottom of the nozzle body can be closed directly or indirectly with a cover.

18. The device according to claim 2, wherein at their end pointing towards the outer circumferential surface of the nozzle body the openings have an internal diameter larger than the external diameter of the nozzle tips in this region so that between the outer wall of the nozzle tips and the inner wall of the openings there is formed a region having an annular cross-section into which the plastic material is injected.

19. The device according to claim 18, wherein the annular region is enclosed by a ring element which is arranged in the opening of the nozzle body.

20. The device according to claim 19, wherein the ring element is made of a poorly heat-conducting material, especially of titanium.

21. The device according to claim 19, wherein the ring element projects at least slightly over the outer circumferential surface of the nozzle body and can be brought to rest in a sealing fashion against the allocated surface of the tool having the mould cavity.

22. The device according to claim 2, wherein the nozzle body has a central feed channel for the plastic material to be sprayed, which branches into feed pipes to the nozzle tips.

23. The device according to claim 22, wherein the feed pipes open directly into the annular region around the nozzle tips.

24. The device according to claim 22, characterised in that the nozzle tips each have a recess which is substantially continuous in the longitudinal direction, which extends from the head surface into the region of the tip, wherein the feed pipes open into the nozzle tips in the area of the head surface so that the plastic material is injected directly via the nozzle tips into the annular region.

25. The device according to claim 24, characterised in that the fixing element has substantially radially running channels corresponding to the number of nozzle tips, wherein these channels are connected at their first end to the feed channel of the nozzle body and open into the respective recesses of the nozzle tips at their second end.

26. The device according to claim 1, wherein the nozzle body is provided with a device for tempering, especially with a heating device.

* * * * *